United States Patent
Boothe

[15] 3,635,235
[45] Jan. 18, 1972

[54] FLUID CONTROL SYSTEM

[72] Inventor: Willis A. Boothe, Scotia, N.Y.
[73] Assignee: General Electric Company
[22] Filed: Jan. 2, 1970
[21] Appl. No.: 375

[52] U.S. Cl. ........................................................137/81.5
[51] Int. Cl. ..................................................F15c 3/08
[58] Field of Search.................137/81.5; 91/3; 235/201

[56] References Cited

UNITED STATES PATENTS

| 2,976,848 | 3/1961  | Place         | 137/596.16 X |
| 3,038,449 | 6/1962  | Murphy, Jr. et al | 137/596.16 X |
| 3,124,999 | 3/1964  | Woodward      | 137/81.5 X   |
| 3,137,309 | 6/1964  | Blase et al.  | 137/81.5 X   |
| 3,139,109 | 6/1964  | Ruchser       | 137/596.16   |
| 3,396,631 | 8/1968  | Woodward      | 137/81.5 X   |
| 3,410,291 | 11/1968 | Boothe et al. | 137/81.5     |
| 3,413,994 | 12/1968 | Sowers        | 137/81.5     |
| 3,438,384 | 4/1969  | Hurvitz       | 137/81.5     |
| 3,444,877 | 5/1969  | Atchley       | 137/81.5     |
| 3,468,220 | 9/1969  | Lazar         | 137/81.5 X   |

*Primary Examiner*—Samuel Scott
*Attorney*—Paul A. Frank, Richard R. Brainard, John F. Ahern, Julius J. Zaskalicky, Louis A. Moucha, Frank L. Neuhauser, Oscar B. Waddell and Joseph B. Forman

[57] ABSTRACT

Control pressure to a hydraulic control valve is supplied by a fluid amplifier. Pressure feedback paths are provided to the amplifier inputs from both the amplifier outputs and the hydraulic control valve outlets so as to utilize sufficient pressure of the fluid amplifier to overcome friction within the control valve assembly. The amplifier and associated feedback paths further constrain the system output differential pressure to be linearly proportional to the system input differential pressure.

3 Claims, 3 Drawing Figures

Inventor:
Willis A. Boothe,
by Louis A. Moncha

Inventor:
Willis A. Boothe,
by Louis A. Moncha

FLUID CONTROL SYSTEM

My invention relates generally to hydraulic control systems and, more particularly, to means for providing linearity to, and compensating for friction hysteresis in, the operation of such systems.

In conventional hydraulic servocontrol systems, a predetermined control pressure is applied in order to cause a control valve to assume a desired position, and thus produce the desired output pressure or flow. In most such systems, the output pressure is a function of the input pressure. Should friction be present in the actuation of the valve, some of the input pressure would be absorbed in overcoming the actuating friction of the valve. Under favorable conditions this would cause a time lag, the response of the valve output being delayed because of friction which the input pressure is being called upon to overcome. In the worst case, a small pressure input would not be sufficient to overcome static friction and the valve would not respond at all. Should additional input pressure be made available to overcome the static friction, the valve will tend to "overshoot" and the problem would arise of reducing input pressure before the desired output had been obtained. The described effect, termed "friction hysteresis," has been a major obstacle in the development of rapid linear-response fluid control systems.

It is, therefore, an object of my invention to provide an improved fluid control system in which the effects of valve friction are automatically overcome.

It is another object of my invention to provide reserve control pressure for overcoming friction while maintaining a system output pressure which is linearly proportional to an input pressure.

It is a further object of my invention to provide an improved hydraulic control system which is actuated by a fluid amplifier.

A still further object of my invention is to provide a hydraulic control system which produces a high flow capacity output pressure that varies as a linear function of input pressure.

In accordance with my invention, in one form thereof there is provided a hydraulic valve having a source pressure inlet, drain outlets, load pressure outlets and control pressure inlets. The establishment of a differential between the pressure of the fluids supplied to the valve control pressure inlets actuates the valve in a manner such that the source fluid communicates more freely with a predetermined load pressure outlet, and more restrictively with the corresponding drain outlet, (i.e., bridge circuit operation). The valve control pressures are supplied by one or more stages of high gain analog-type fluid amplifiers which develop differential or "push-pull" outputs. Pressure feedback paths are established from the outputs of the fluid amplifier and each valve load pressure outlet to the fluid amplifier control inputs in negative feedback relationship. Should the hydraulic valve not respond to the initial control pressure differential, the valve load outlet pressure does not change, and the corresponding lack of such feedback to the fluid amplifier input allows the entire amplifier output to be available to cause the valve to move in the desired direction. In this manner, only as much fluid pressure as is necessary to cause the valve to move is supplied thereto.

In addition to compensating for the effects of frictional forces in the operation of a hydraulic valve, the high-gain amplifier used in conjunction with the feedback paths described herein constrains the differential output pressure of the valve to be linearly proportional to the input differential pressure supplied to the system.

Other objects and advantages of my invention will become apparent from the following description taken in conjunction with the accompanying drawings in which.

Figure 1:
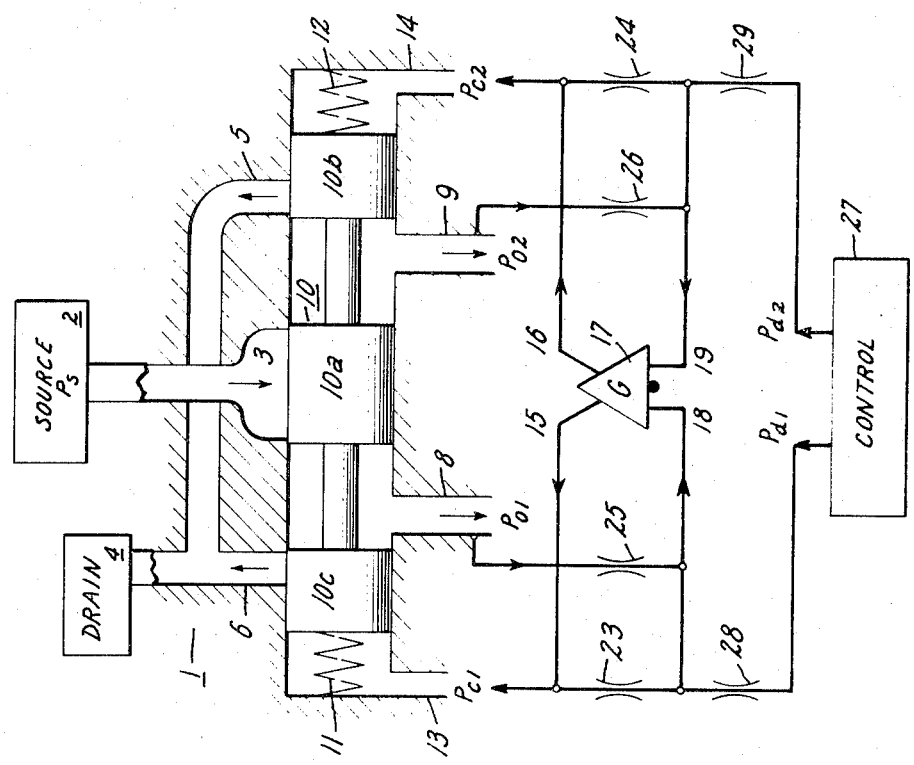
FIG. 1 is a combined diagrammatic and schematic view of a fluid control valve and associated fluid amplifier circuit in accordance with my invention.

Referring now to FIG. 1, a single-stage, spring-centered spool-type hydraulic valve is represented generally at 1. A fluid source 2 provides pressurized hydraulic fluid at a pressure $P_s$ to valve inlet 3. Fluid entering the valve but not applied to a load is returned to drain 4 by means of drain outlets 5 and 6. Depending upon the position of the valve elements, fluid supplied by source 2 is adjustably apportioned between load pressure outlets 8 and 9 as output pressures $P_{o1}$ and $P_{o2}$, respectively. The FIG. 1 (and also FIG. 2) valves thus function as fluid bridge circuits. The output pressures are applied to a load device, (not shown), which responds in a predetermined manner to the output differential pressure $P_{o1}-P_{o2}$.

Within the body of the valve 1 is located a movable spool indicated at 10. Springs 11 and 12 are provided at either end of the spool to cause it to tend to return to a center, or null, position. In the embodiment shown, a central member $10a$ of the spool 10 acts to close off pressure source inlet 3 in its null position, while, should the spool be axially displaced, fluid from the source 2 would be directed through inlet 3 and toward a predetermined end of the spool, where the corresponding drain and output pressure outlets are located. Members $10b$, $10c$ at either end of the spool will restrict drain outlets 5 or 6 and cause a predominant portion of incoming fluid to flow to the desired load pressure outlet.

Control pressure inlets 13 and 14 are provided to direct fluid at control pressures $P_{c1}$ and $P_{c2}$ to opposite ends of the spool. Pressures $P_{c1}$ and $P_{c2}$ are developed at outputs 15 and 16 of a proportional-type fluid amplifier 17. The amplifier 17 is of the active type and has a pair of control inputs indicated at 18 and 19 which receive fluid from a command pressure source, indicated as control 27.

While it is often advantageous to utilize a multistage fluid amplifier 17 having an overall gain of upward of 250, a single-stage hydraulic fluid amplifier device will suffice as long as the gain of the amplifier is of the order of 50 or greater. The hydraulic fluid amplifier is very similar to a pneumatic fluid amplifier, the chief distinction being that instead of vents, the hydraulic amplifier uses drains for returning the vented liquid to a sump. With a gain of approximately 50, the input impedance of the device is not critical, although it should be of an order of magnitude less than the resistance value of the conduits leading to the amplifier control inputs.

The differentially pressurized fluid supplied by control source 27 is at command pressures $P_{d1}$ and $P_{d2}$, and communicates with opposed fluid amplifier control inputs 18 and 19 by means of conduits having summing restrictors 28, 29 therein. In addition, spool valve control pressures $P_{c1}$ and $P_{c2}$ are fed back in a negative feedback sense from the amplifier outputs 15, 16 through conduits containing summing restrictors 23 and 24 to fluid amplifier inputs 18 and 19. The purpose of the negative feedback paths including restrictors (fluid resistors) 23, 24 is to convert the high gain amplifier to an operational amplifier to thereby obtain a device whose gain is very linear and independent of changes in power fluid supply pressure. This first negative feedback is not an essential feature of my invention, but is desirable for purposes of optimum performance of my hydraulic control system. Pressures $P_{o1}$ and $P_{o2}$ from hydraulic valve load outlets 8 and 9 are also fed back in a negative feedback sense to the fluid amplifier control inputs 18, 19 through conduits having summing restrictors 25 and 26 therein and provide pressure signals at the amplifier inputs for modifying the amplifier output in accordance with the pressures $P_{o1}$ and $P_{o2}$ at the outlets of the valve. Amplifier control inputs 18, 19 are depicted in the schematic representation of amplifier 17 as being single inputs, in which case the two feedback signals and command signal are summed prior to being supplied to each amplifier input. Alternatively, amplifier 17 may be provided with three pairs of control inputs thereby utilizing a single signal for each input. In the absence of friction in the spool valve, the system output differential pressure $P_{o1}-P_{o2}$ will thus be constrained to be linearly proportional to the differential command pressure $P_{d1}-P_{d2}$, the factor of proportionality approaching the ratio $R_{25}/R_{28}$ (restrictive value $R_{25}$ of the conduit and restrictor supplying output feedback pressure $P_{01}$, and the restrictive value $R_{28}$ of the conduit and restrictor supplying command pressure $P_{d1}$) as amplifier gain is increased. This ratio holds true for symmetrical relationships of the restrictors as defined below.

The restrictors act in conjunction with the high-gain fluid amplifier and valve to provide a high-gain closed-loop system as will be understood by those skilled in the art. In general, each pair of restrictors are of equal resistance value (i.e., $R_{23}=R_{24}$, $R_{25}=R_{26}$ and $R_{28}=R_{29}$). Although illustrated as fixed restrictors, variable fluid restrictors (resistors) may be used if adjustment in gain is desired.

Under steady-state conditions with no net control input to amplifier 17 ($P_{d1}-P_{d2}=0$, or $P_{d1}=P_{d2}$), and spool valve 10 being centered, the amplifier output pressures (the valve control pressures) are equal, $P_{c1}=P_{c2}$ and the valve load outlet pressure are equal, $P_{01}-P_{02}=0$, whereby the various amplifier feedback pressure are also equal.

To operate the hydraulic valve illustrated in FIG. 1, a differential is established between the command pressures $P_{d1}$ and $P_{d2}$ at the output of command pressure source 27. The selected command pressure $P_{d1}-P_{d2}$ determines a desired system output pressure $P_{01}-P_{02}$. The fluid supplied by this control 27 traverses restrictors 28 and 29, thus experiencing a pressure drop, and is communicated as a reduced differential pressure to control inputs 18 and 19 of fluid amplifier 17 to thereby develop an amplified differential pressure $P_{c1}-P_{c2}$ at the outputs thereof, this amplifier output pressure being the spool valve control input pressure.

For purposes of illustration, assume that command pressure $P_{d1}$ is greater than $P_{d2}$. In this case, the greater output flow of fluid, and thus the higher pressure output, from fluid amplifier 17 is diverted to output 16 causing the pressure output $P_{c2}$ thereof to exceed pressure output $P_{c1}$ from opposite output 15. Since pressure $P_{c2}$ is greater than $P_{c1}$, the differential pressure $P_{c1}-P_{c2}$ causes spool 10 to move leftward. If friction causes spool 10 to move slowly or in the worst case, to stick, spool valve control pressure differential $P_{c2}-P_{c1}$ continues to increase, and rapidly approaches the maximum pressure differential available from the fluid amplifier since system output differential pressure $P_{02}-P_{01}$ being fed back is increasing slowly if spool 10 moves slowly or remains constant at zero differential if spool 10 sticks. This valve control differential pressure $P_{c2}-P_{c1}$ reacts on spool member 10$b$ to accelerate the movement of spool 10 to a position where sufficient system output differential pressure $P_{02}-P_{01}$ is being supplied by the valve to drive the amplifier output differential pressure $P_{c1}-P_{c2}$ to the value necessary to maintain the spool in its position as demanded by command pressure $P_{d1}-P_{d2}$. The condition of system output pressures $P_{01}$ and $P_{02}$ being equal causes little feedback to counter the increasing spool valve control differential pressure $P_{c2}-P_{c1}$. Sufficient negative feedback of system output differential pressure $P_{02}-P_{01}$ to significantly counter the effect of increasing valve control differential pressure $P_{c2}-P_{c1}$ does not occur until spool central member 10$a$ is displaced to uncover pressure source inlet 3 and thereby increase $P_{02}$, at the same time decreasing $P_{01}$ as spool member 10$c$ uncovers drain outlet 6.

In the case of only slight frictional forces, the rather prompt movement of spool member 10$b$, and thus member 10$a$, promptly uncovers pressure source inlet 3 to permit rapid increase in valve output differential pressure $P_{02}-P_{01}$. Under this condition of slight frictional forces, the spool accelerates rapidly to its command position and the feedback differential pressure $P_{02}-P_{01}$ also increases rapidly. The rapid increase in differential pressure $P_{02}-P_{01}$ quickly reduces the full output differential pressure $P_{c2}-P_{c1}$ available from amplifier 17, or may even prevent the amplifier from attaining its maximum output pressure in cases of very slight friction.

It is thus seen that an important result of using the analog-type fluid amplifier and associated negative feedback conduits or channels in accordance with my invention is to make available as much valve control pressure from the output of the amplifier as is necessary to cause a rapid response of the spool valve.

In the embodiment shown, the relationship between the input $P_{d1}-P_2$ and output $P_{01}-P_{02}$ pressure differentials may be changed simply by varying the resistance values of restrictors 25, 26 and, or 28, 29. Further, by using a fluid amplifier with a high gain and a high impedance to input fluid flow, the system differential output pressure $P_{01}-P_{02}$ will be constrained to be linearly proportional to the differential command pressure $P_{d1}-P_{d2}$ as stated previously.

Figure 2:
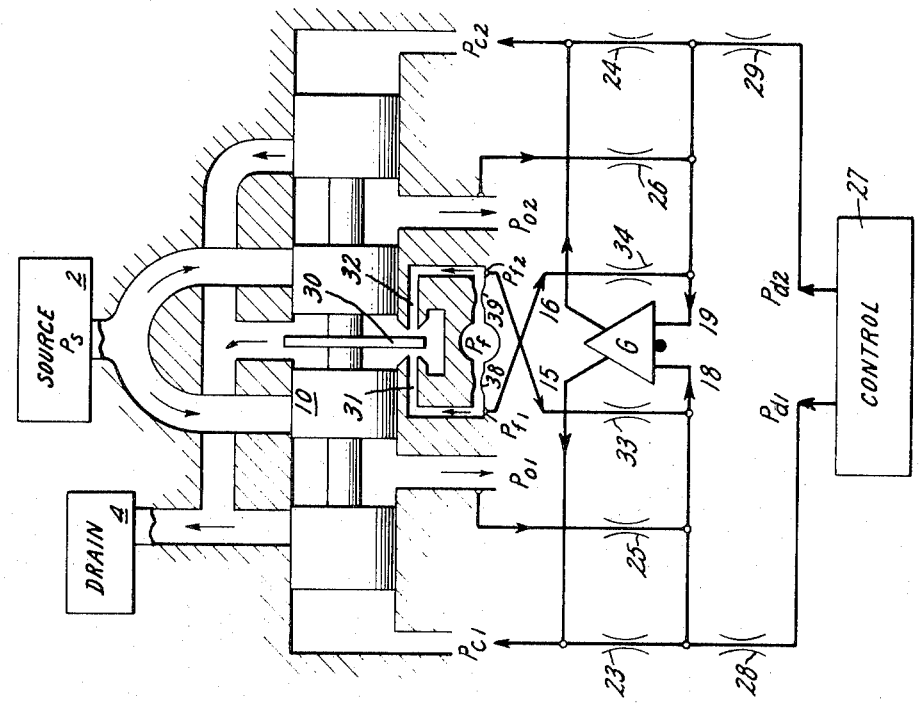
FIG. 2 is a combined diagrammatic and schematic view of a second embodiment of my invention including a fluid control valve and fluid amplifier circuit having additional feedback channels.

A further embodiment of the invention is shown in FIG. 2 wherein two axially oriented position sensing nozzles 31, 32 and a disk (flapper) 30 attached to spool 10 function as a flapper valve assembly. Suitable means may be associated with the flapper assembly to reduce the axial motion of flapper 30, but maintaining a proportional motion. Examples of such means include linkages or flexure members. Nozzles 31, 32 are supplied from a source of hydraulic fluid at a pressure $P_f$ by way of conduits having equal resistance value restrictors 38, 39 therein. The springs 11 and 12 are not in the FIG. 2 system. The feedback system operates in the manner described above with the difference being that the restoring force of springs 11 and 12 is not present. Instead, valve displacement signal $P_{f1}-P_{f2}$ is proportional to valve travel and mathematically serves a function similar to spring force in the closed loop. The pressures within nozzles 31 and 32 indicated by $P_{f1}$ and $P_{f2}$, respectively, are a function of the degree to which the nozzles are restricted by the side surfaces of flapper 30. Position feedback pressures $P_{f1}$ and $P_{f2}$ are fed back in a negative sense to inputs 19 and 18, respectively, of fluid amplifier 17 by way of conduits having restrictors 34, 33 therein. Should pressure $P_{c1}$ exceed $P_{c2}$, causing spool 10 to move to the right, for instance, flapper 30 approaches nozzle 32, restricting the flow therefrom and causing pressure $P_{f2}$ to increase, and $P_{f1}$ to decrease. In the example given, an increase in pressure differential $P_{f2}-P_{f1}$ reduces amplifier output pressure $P_{c2}$ and thereby increases pressure $P_{c1}$. Should spool 10 not respond to the increase in valve control differential pressure $P_{c1}-P_{c2}$, due to high frictional forces, an additional feedback pressure differential $P_{f2}-P_{f1}$ is not generated and thus no additional back pressure therefrom would be fed back to fluid amplifier control input 18. As a result, amplifier 17 provides its full pressure output at output 15 and remains at this level until spool 10 is displaced to the right to the position dictated by command pressure $P_{d1}-P_{d2}$. The additional position feedback from nozzles 31 and 32 thus operates to enhance the response in the presence of frictional forces and thereby renders the FIG. 2 system less sensitive to friction than the FIG. 1 system. It is evident that an equivalent position pickoff can be made using radially oriented sensing nozzles working onto a tapered surface on the spool. The spool valve system embodiments of FIGS. 1 and 2 are high flow capacity systems since there is no power drain in the steady-state condition where the spool valve is centered. It should be understood that fluid sources $P_s$ in FIGS. 1 and 2, source $P_f$ in FIG. 3, and source $P_s$ in FIG. 3, as well as the power fluid sources for the fluid amplifier 17, are normally at constant pressures.

Figure 3:
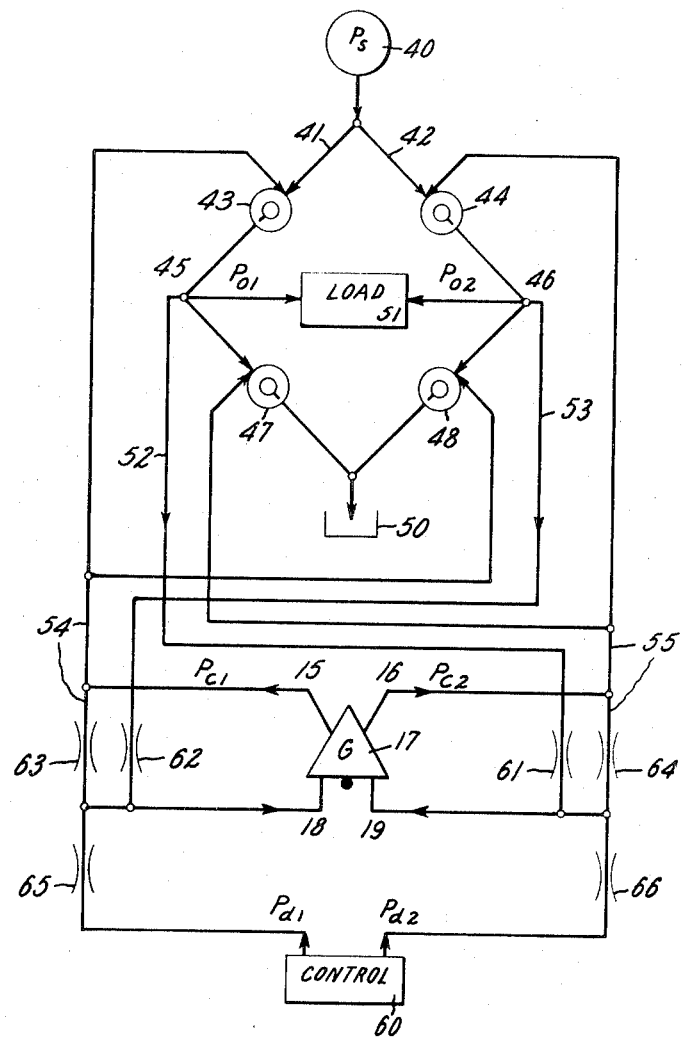
FIG. 3 is a schematic representation of my inventive control system used in conjunction with a vortex bridge-type circuit.

It will be appreciated that the controlled valve need not be a single unit. For instance, two separate three-way spool valves may be provided, each having provision for admitting a flow from a source of pressurized fluid and a drain therefor, a pressure outlet for providing pressurized fluid to a load, and a control pressure inlet for the application thereto of fluid at a controlled pressure. The valves may be linked together such that an increase in the output pressure of one is effected simultaneously with a decrease in the output pressure of the other. In fact, the individual three-way valve function can be performed in a no-moving part manner using two vortex-type fluid amplifiers as pressure-controlled variable restrictors. Such an arrangement is shown in FIG. 3. FIG. 3 illustrates a bridge-type fluid circuit such as disclosed in U.S. Pat. No. 3,410,291 Boothe et al., assigned to the assignee of the present invention.

Pressurized fluid from a source 40 is supplied at pressure $P_s$ through channels 41 and 42 which have variable fluid flow restrictors 43 and 44 placed therein. The outputs of the restrictors are conducted to junctions 45 and 46, connected to the inlets of variable flow restrictors 47 and 48. Variable flow restrictors 43, 44, 47 and 48 may advantageously take the form of vortex-type fluid amplifiers having no moving mechanical parts and each having a main fluid pressure inlet (schematically shown as the radial input), a control fluid pressure inlet (the tangential input), and a fluid output (schematically shown as a small central circle). Such a device is shown in conjunction with a bridge-type fluid circuit in U.S. Pat. No. 3,410,291 cited above. Fluid at pressure $P_{c1}$ is supplied to the control fluid inlets of restrictors 43 and 48, while fluid at pressure $P_{c2}$ is supplied to the control inlets of restrictors 44 and 47. Fluid from the restrictors 47 and 48 is exhausted into drain 50. Load 51 is supplied with the fluid output of restrictors 43 and 44 at pressures $P_{01}$ and $P_{02}$, from junctions 45 and 46, respectively.

The circuit may thus be considered to be comprised of two three-way valves acting in complementary fashion; each valve made up of two vortex amplifiers. The first valve provides an output pressure at junction point 45, and includes variable restrictors 43 and 47; and the second valve provides an output pressure at junction point 46, and includes variable restrictors 44 and 48.

The control system for operating the bridge circuit is similar to that used with the spool valve of FIG. 1. Valve output pressures $P_{01}$ and $P_{02}$ are provided in negative feedback relationship through conduits 52 and 53 having restrictors 61, 62 therein from output junctions 45 and 46 of the bridge circuit to control inputs 18 and 19 of fluid amplifier 17. Amplifier output pressures $P_{c1}$ and $P_{c2}$ are also fed back in negative feedback relationship to the input of the amplifier by conduits 54, 55 having restrictors 63, 64 therein. Command pressures $P_{d1}$ and $P_{d2}$ are provided by a control source 60, the fluid traversing conduits having restrictors 65, 66 therein, to the fluid amplifier control inputs 18 and 19. The selected command pressures $P_{d1}-P_{d2}$ determine the desired system output pressure $P_{01}-P_{02}$.

As pointed out in the discussion of FIG. 1, the factor of proportionality between the input and output differential pressures of the system is the ratio of the resistance value of restrictors 61 and 62 to that of restrictors 65 and 66. It will be recognized by those skilled in the art that discrete, fixed restrictors are shown merely as a matter of convenience and represent the total restrictive value of that segment of conduit in which they are placed.

In operation, an increase in differential pressure $P_{d1}-P_{d2}$ causes the pressure at fluid amplifier inlet 18 to increase, which increases the amplifier output pressure $P_{c2}$. Pressure $P_{c2}$ is transmitted by means of conduit 55 to the control inlets of variable flow restrictors 44, 47 causing a throttling or restriction of the fluid entering the main fluid inlets thereof. Pressure $P_{c1}$ is transmitted via conduit 54 to the control inlets of restrictors 43, 48. Since $P_{c1}$ is decreased, the resistance of restrictors 43 and 48 decreases. Back pressure at the inlet of restrictor 47 coupled with decreased resistance of restrictor 43 causes outlet pressure $P_{01}$ to increase, while the increased restrictive action (resistance) of restrictor 44 and decreased resistance of restrictor 48 causes a decrease in outlet pressure $P_{02}$. The increase in pressure $P_{01}$ is sensed at junction 45 and fed back to fluid amplifier control input 19 by means of conduit 52, and the decrease in outlet pressure $P_{02}$ is sensed at junction 46 and fed back to control input 18 by means of conduit 53. The increased negative feedback pressure thus provided at input 19 causes $P_{c1}$ to increase, and $P_{c2}$ to decrease to steady-state values dictated by command pressure $P_{d1}-P_{d2}$.

Just as in the system of FIG. 1, the use of a high-gain, high input impedance fluid amplifier constrains the differential output pressure $P_{01}-P_{02}$ to be linearly proportional to differential input pressure $P_{d1}-P_{d2}$. While in the present embodiment it will be recognized that the absence of moving parts eliminates problems due to friction, the control circuit of the subject invention has the advantage of producing a linear system response without the necessity of providing specially matched components. The control system will inherently compensate for nonlinearities in the variable restrictors, making it usable with a wide variety of such devices. Moreover, since the proportionality factor, or system gain, relating input and output differential pressures is primarily dependent upon the ratio of the resistance values of restrictors 61, 62 and 65, 66 a variable-gain linear system is easily attained by simply replacing fixed resistance value restrictors 61, 62 and, or 65, 66 with variable resistance value restrictors.

Although the FIGS. 1, 2 and 3 embodiments have all been described with reference to hydraulic control systems, it should be obvious that they are also useful in pneumatic control systems. The FIG. 3 embodiment is especially suited for pneumatic fluid operation due to the absence of mechanical friction present in the two spool valve embodiments. Obviously a pneumatic fluid amplifier would be utilized in place of the hydraulic fluid amplifier for pneumatic control system operation.

From the foregoing description it can be appreciated that my invention makes available an improved fluid control system which produces a high flow capacity output pressure that varies as a linear function of input pressure. These desirable features are obtained through the use of a sufficiently high gain proportional-type fluid amplifier and negative feedback from the load input to the amplifier input. The invention is especially well adapted for use in systems employing spool valves or similar moving devices subject to considerable friction forces since the control system automatically overcomes valve friction effects. An additional position feedback from the spool valve renders such system less sensitive to friction.

I claim:

1. In a pressurized fluid control system comprising
   first, second, third and fourth pressure-controlled variable restrictors connected in bridge circuit relationship, said first and said third restrictors connected in series, said second and said fourth restrictors connected in series, said first and second restrictors having a common inlet from a source of pressurized fluid, said third and fourth restrictors having a common outlet to a common drain,
   a first pressure outlet at the junction between said first and third restrictors, and a second pressure outlet at the junction between said second and said fourth restrictors,
   high gain proportional-type fluid amplifier means comprising first and second opposed control inputs and first and second outputs, the pressure at said first output increasing when the pressure at said second control input exceeds that at said first input, and the pressure at said second output increasing when the pressure at said first control input exceeds that at said second input,
   means coupling said amplifier means first output to said first and said fourth variable restrictors and coupling said amplifier means second output to said second and said third variable restrictors,
   feedback means restrictively coupling said first pressure outlet to said amplifier second input and restrictively coupling said second pressure outlet to said amplifier first input in negative feedback relationship,
   feedback means restrictively coupling said amplifier first output to said amplifier first input and restrictively coupling said amplifier second output to said amplifier second input in negative feedback relationship, and
   means for restrictively coupling a first command pressure to said amplifier first input and restrictively coupling a second command pressure to said amplifier second input wherein the command pressures determine desired pressures at said first and second outlets.

2. In the fluid control system recited in claim 1 wherein said pressure-controlled variable restrictors are vortex-type fluid amplifiers having no moving mechanical parts.

3. In a fluid pressure control system comprising valve means adapted for mechanical movement comprising an inlet for coupling said valve means to a source of pressurized fluid, a drain outlet for exhausting the fluid therefrom, first and second outlets for supplying the pressurized fluid to a load, and first and second inlets for receiving control pressures which initiate movement of said valve means, high gain proportional-type fluid amplifier means comprising first and second opposed control inputs and first and second outputs, the pressure at said first output increasing when the pressure at said second control input exceeds that at said first input, and the pressure at said second output increasing when the pressure at said first control input exceeds that at said second input, means for coupling said amplifier means first output to said first control inlet of said valve means and coupling said amplifier means second output to said second control inlet of said valve means, feedback means restrictively coupling said first outlet of said valve means to said amplifier first input and restrictively coupling said second outlet of said valve means to said amplifier second input in negative feedback relationship, the high gain fluid amplifier means and feedback means making available as much amplifier output pressure as is necessary to cause rapid response of said valve means and thereby compensating for any frictional forces associated with said valve means, means for restrictively coupling a first command pressure to said amplifier first input and restrictively coupling a second command pressure to said amplifier second input wherein the command pressures determine desired pressures of said first and second outlets and said system controls the first and second outlet pressures at the desired pressure, a flapper attached to said valve means and a pair of nozzles axially oriented on opposite sides of said flapper and supplied from a second source of pressurized fluid whereby the pressurized fluid emitted from said nozzles is directed against opposite sides of said flapper, and feedback means restrictively coupling a first and second of said pair of nozzles to said amplifier second and first inputs, respectively, in negative feedback relationship for providing a restoring force to cause said valve means to tend to return to a null position.

* * * * *